United States Patent [19]

Kuppenheimer, Jr.

[11] Patent Number: 5,023,440

[45] Date of Patent: Jun. 11, 1991

[54] TRACKER USING ANGLE-CONVERTING CONES

[75] Inventor: John D. Kuppenheimer, Jr., Tewksbury, Mass.

[73] Assignee: Lockheed Sanders, Inc., Nashua, N.H.

[21] Appl. No.: 484,375

[22] Filed: Feb. 23, 1990

Related U.S. Application Data

[63] Continuation-in-part of Ser. No. 725,620, Apr. 22, 1985, abandoned.

[51] Int. Cl.$^5$ .............................. H01J 3/14; G01J 1/20
[52] U.S. Cl. .................................. 250/203.6; 250/216; 356/152
[58] Field of Search ............... 250/203.1, 203.2, 203.3, 250/203.4, 203.6, 216; 350/630; 356/152, 141

[56] References Cited

U.S. PATENT DOCUMENTS

| | | | |
|---|---|---|---|
| 3,446,970 | 5/1969 | Moskowitz et al. | 250/203.6 |
| 3,599,001 | 8/1971 | Rolnik et al. | 250/203.1 |
| 3,899,672 | 8/1975 | Levi-Setti | 350/630 |
| 3,923,381 | 12/1975 | Winston | 350/630 |
| 4,042,821 | 8/1977 | Mierzwinski | 250/216 |
| 4,255,782 | 9/1980 | Kuppenheimer, Jr. et al. | 250/216 |
| 4,273,196 | 6/1981 | Etsusaki et al. | 250/203.3 |
| 4,424,801 | 1/1984 | Mori | 250/203.4 |
| 4,618,259 | 10/1986 | Czichy et al. | 356/152 |

Primary Examiner—David C. Nelms
Assistant Examiner—Michael Messinger
Attorney, Agent, or Firm—Cesari and McKenna

[57] ABSTRACT

An optical tracker includes a plurality of detectors (20, 22), each of which is associated with an étendue-preserving concentrator (27, 28) that directs radiation to it. The concentrators (27, 28) associated with complementary detectors (20, 22) are oriented at angles with respect to each other such that their complementary angle-sensitive regions overlap. As a consequence, the outputs of the detectors can be used to aim the tracker even though the concentrators direct radiation to the detectors in a non-imaging manner.

12 Claims, 6 Drawing Sheets

TRACKER USING ANGLE-CONVERTING CONES

BACKGROUND OF THE INVENTION

This is a continuation-in-part of U.S. patent application Ser. No. 06/725,620 filed on Apr. 22, 1985 by John D. Kuppenheimer, Jr. for a Tracker Using Angle Converting Cones, now abandoned.

This invention relates to radiation-detection systems and in particular to radiation-detection systems used to track optical targets.

There are many applications, many of them military, in which it is necessary to track a target that emits or reflects radiation. Trackers for performing such a function typically use a plurality of radiation detectors and determine the direction of the radiation-emitting or-reflecting target by comparing the levels of radiation that the different detectors receive. In a typical tracker, the orientation of the tracker is adjusted so as to achieve a predetermined relationship among the detector outputs, which relationship indicate that the tracker is aimed at the target. For tracking in two dimensions, a quad cell, comprising four radiation detectors, is employed. For tracking in only one dimension, a bi-cell, i.e., a two-detector arrangement, is sufficient.

A significant fraction of the expense that attends tracker design and manufacture results from the imaging lenses and/or mirrors employed to collect the radiation received from the source and direct it to the detector. A lens or mirror is referred to as "imaging" in such systems because the point in the detector plane to which it directs radiation is determined by the angle, but independent of the location, at which the lens or mirror receives the radiation. Consequently, for a target in the typical distance range of interest, all of the radiation received from a given target point is directed to the same point in the detector plane, and the resultant radiation pattern accordingly forms an image of the target field of view. In conventional trackers, it is this imaging feature that enables the position of the target to be determined by comparing the detector outputs; if the radiation received at a given angle were evenly distributed among all of the detectors, comparison of the detector outputs would not provide an indication of the target direction.

Strictly speaking, the imaging system does not have to focus the incoming radiation completely; the system may be defocused so that the spot caused by radiation from a given angle is wide enough to include parts of more than one detector of the quad cell, so long as the relative signal levels generated thereby depend on the direction of the radiation source. As a practical matter, however, it is desirable for the radiation to be focused relatively well, because a high degree of focusing enables the radiation detectors to be very small and thus low in capacitance. This latter feature contributes to the speed of response of the signal-processing circuitry employed in the tracker.

Unfortunately, the focusing requirement presents some difficulties. In order to collect as much radiation as possible from the source being tracked and therefore to maximize the signal-to-noise ratio, it is desirable to employ a lens whose diameter is as large as is practical. However, lens aberrations typically increase with lens diameter, and these aberrations detract from the ability of the lens to focus. Of course, care can be taken to minimize the aberrations in even a large lens, and compound lenses are often employed for this purpose. But high-quality compound lenses are both expensive and heavy, so it is not always feasible to employ them.

Another complication often encountered in trackers is the need to provide for target acquisition separately from target tracking. As was mentioned above, it is desirable for the individual detectors to be relatively small. It is also important for their outputs to be highly dependent on the angle at which the tracker receives radiation so that their relative outputs can be used to aim the tracker accurately. Unfortunately, the result of this combination of requirements is usually that the tracking detectors do not respond to radiation whose angle of incidence falls outside a fairly narrow range. A consequence of this result is that trackers also require additional detectors for acquisition, i.e., for determining that a target is present before the tracker has actually locked onto it, if targets are to be acquired from a reasonably wide field of view. Naturally, the provision of acquisition circuitry and detectors adds an additional layer of complexity to the tracker.

An object of the present invention is to reduce the expense and weight required of high-sensitivity trackers. Another is to minimize the complexity of the tracker apparatus.

SUMMARY OF THE INVENTION

The foregoing and related objects are achieved in a tracker that includes an aiming mechanism and a receiver assembly that the aiming mechanism can aim at a target. The receiver assembly includes a separate non-imaging concentrator associated with each of a plurality of detectors. There are typically two detectors for each dimension in which tracking is to occur, although the principles of the invention can be practiced with larger arrays of detectors, too.

The concentrators direct radiation in a non-imaging manner; that is, the concentrators direct the radiation to the detector planes without in general localizing it in these planes in accordance with its angle of incidence at the concentrator input aperture. As a consequence, the invention can be practiced without using lenses, and, although the concentrators employ reflective surfaces, without using reflective surfaces as optically accurate as focusing mirrors ordinarily need to be. Each concentrator typically directs to its associated detector a large percentage of the radiation that reaches its aperture at any angle within a wide reception range of incident angles. A concentrator can readily be shaped so that the percentage of received radiation that it directs to its associated detector abruptly drops to a minimum immediately beyond that reception range; that is, so that it is very dependent on the angle of incidence in the narrow range in which it drops to the minimum.

The detectors in each pair are oriented with respect to each other in such a manner that their reception ranges differ, and preferably in such a manner that their complementary ranges of high sensitivity overlap. Control circuitry receives the detector outputs and operates the aiming mechanism so as to drive the receiver assembly to an angle at which the detector outputs have a predetermined relationship, preferably one that prevails in the overlapping ranges of high sensitivity.

The detector outputs can therefore be used not only for tracking but also for acquisition. These features are defined more specifically in the appended claims.

BRIEF DESCRIPTION OF THE DRAWINGS

These and further features and advantages of the present invention are described in connection with the accompanying drawings, in which.

DETAILED DESCRIPTION OF ILLUSTRATIVE EMBODIMENTS

Figure 1:
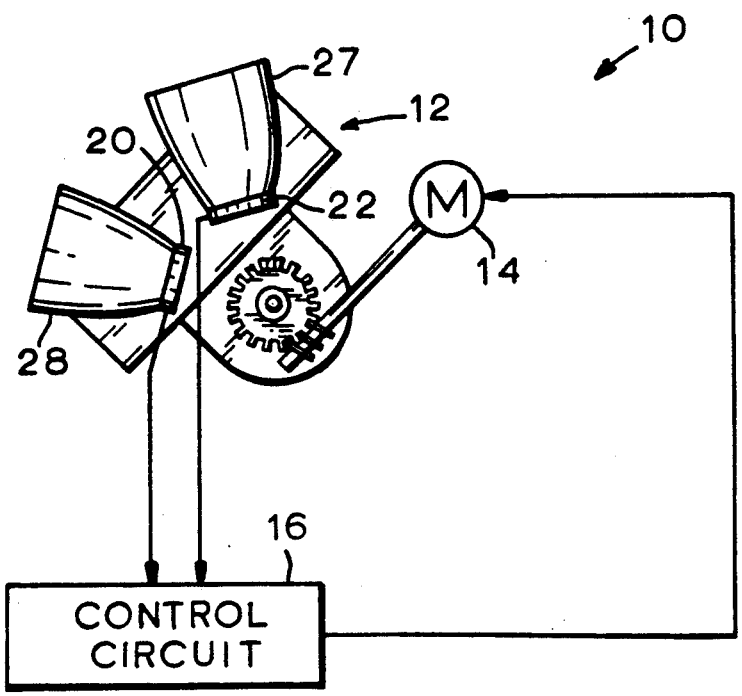
FIG. 1 is a diagrammatic representation of a tracker that employs the teachings of the present invention.

FIG. 1 depicts a tracker 10 that employs the teachings of the present invention. For purposes of explanation, a receiver assembly 12 is shown mounted so as to be pivotable about an axis by a motor 14, which a control circuit 16 drives. In practice, the tracker can be such a system, but it can also be embodied in a guided missile, in which the receiver may be fixed in position with respect to the missile and the aiming of the tracker is accomplished by changing the missile's attitude.

The control circuit 16 receives the outputs from photodetectors 20 and 22, which generate electrical signals in response to the receipt of radiation. Although trackers of this sort typically operate in the optical range, i.e., in the range that includes infrared, ultraviolet, and visible light, those skilled in the art will appreciate that the broader teachings of the present invention are applicable in principle to trackers that detect wave energy of other types.

As is conventional in the tracker art, the control circuit 16 computes a function of the outputs of detectors 20 and 22, and it controls the motor in accordance with that function. Many control strategies are appropriate. In accordance with a simple one, for instance, if the control circuit 16 receives signals representing radiation above a certain threshold, it may cause the motor 14 to pivot the receiver assembly 12 counterclockwise if the output of detector 20 predominates and clockwise if that of detector 22 does. In practice, of course, conventional principles of control-systems theory will suggest more-complex schemes, but the particular control strategy employed is not critical to the practice of the present invention, so I will not discuss specific control strategies in detail.

Figure 2:
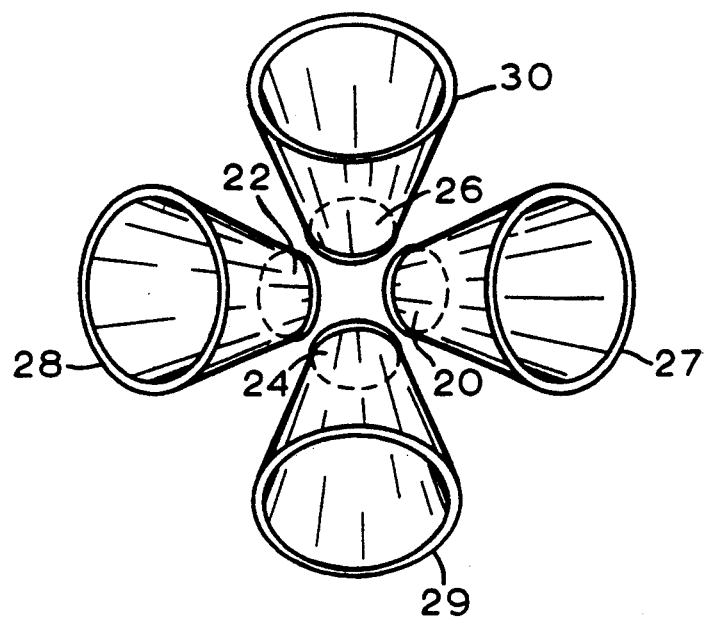
FIG. 2 is a plan view of the concentrator/detector units employed in a two-dimensional version of the tracker of FIG. 1.

FIG. 1 depicts only one dimension of the operation of tracker 10; another motor would typically control pivoting in an orthogonal plane, and two further detectors would be employed with appropriate comparison and driver circuitry to control the other motor. These four detectors would typically be provided in a quad-cell arrangement of the type depicted in FIG. 2, in which additional detectors 24 and 26 are aligned orthogonally to detectors 20 and 22. Since control in the second dimension is largely identical, I will describe the apparatus for control in one dimension only.

The tracker operation described so far is conventional. According to the present invention, however, the tracker 10 does not employ imaging apparatus to direct light to the detectors 20 and 22. Instead, the tracker 10 employs non-imaging concentrators 27 and 28 to direct light to detectors 22 and 20, respectively, in a non-imaging manner.

By definition, if the light is directed to the detectors in a non-imaging manner, all the radiation from a given angle is not ordinarily concentrated in one spot in a detector plane. But I have recognized that the relationship between the detector outputs can be made sufficiently indicative of target direction for tracking purposes, even if the received radiation is directed to the detectors in a non-imaging manner, if the radiation is directed to respective detectors by individual concentrators that are angularly offset from each other. With such an arrangement, it is possible to obtain a wide field of view and avoid expensive lenses and mirrors. Moreover, by employing concentrators that are nearly throughput-preserving, i.e., étendue-preserving, it is possible to maximize tracking accuracy.

An étendue-preserving system is one in which, for an input aperture of area A and an output aperture of area A', all radiation reaching the input aperture at an angle less than angle $\Theta$ will leave the output aperture—i.e., in the present invention, strike the detector—at an angle less than angle $\Theta'$, where $\Theta$ and $\Theta'$ are related by the following equation:

$$n^2 A \sin^2 \Theta = n'^2 A' \sin^2 \Theta',$$

n is the index of refraction of the medium through which the incident radiation propagates, and n' is the medium through which the output radiation propagates. It turns out that the percentage of received radiation forwarded by a concentrator that is nearly étendue-preserving is nearly independent of incidence angle throughout a design angular range but falls abruptly to a minimum immediately outside that range. In the region in which it falls abruptly, therefore, the output of the detector is very sensitive to the angle of incidence of the radiation that causes that output, and I employ this feature for tracking purposes. An example illustrates these principles.

Figure 3:
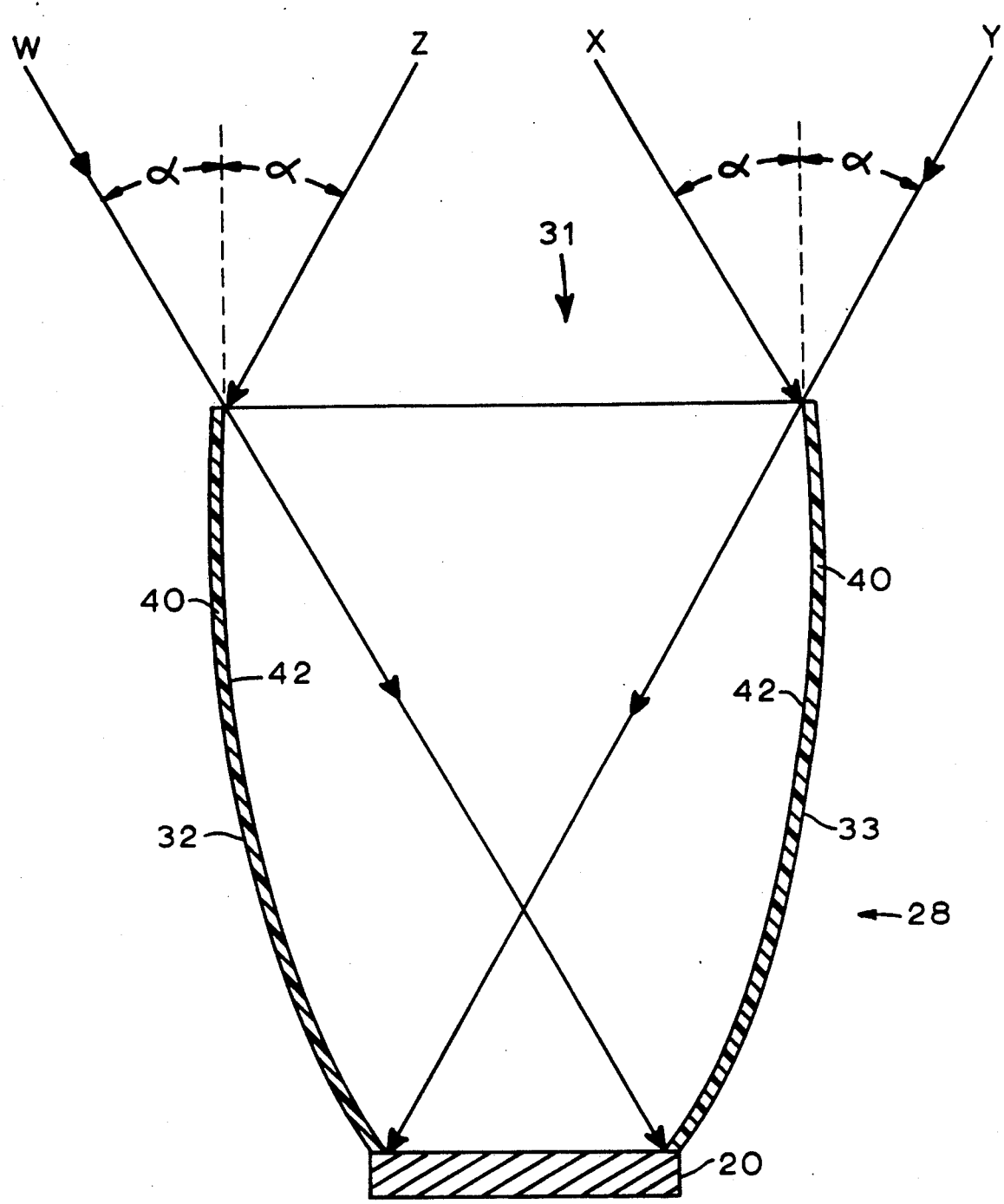
FIG. 3 is a cross-sectional view of a concentrator/detector assembly of the type employed in the tracker of FIG. 1.

FIG. 3 depicts concentrator 28 and detector 20 in cross-section. Concentrator 28 is secured at its smaller rear mouth to detector 20. Concentrator 28 in the illustrated embodiment takes the form of a hollow angle-converting cone whose interior reflects the radiation of interest. In the plane of its axis of symmetry, the illustrated concentrator 28 is an étendue-preserving compound parabola; i.e., each of the curves 32 and 33 defined by the intersection of the concentrator wall with the plane of the concentrator's axis of symmetry is a segment of a respective parabola and meets a respective edge of the detector's cross-section at the focus of the parabola of which the other curve is a segment.

Concentrator 28 is so designed so that, in theory, all radiation reaching the entrance aperture 31 of the concentrator will reach the detector 20 if its path of incidence forms an angle less than a design angle $\alpha$ with the concentrator's axis of symmetry, which is vertical in FIG. 3. The following discussion demonstrates that the concentrator of Figure achieves this design goal and that radiation reaching the entrance aperture 31 at an angle greater than α with the axis of symmetry is prevented from reaching the detector 20.

FIG. 3 depicts an incoming ray W that grazes the left edge of the aperture 31 from the upper left at the design angle α with the axis of symmetry. The collector is designed so that such a ray hits the extreme right corner of the detector 20, i.e., so that a ray grazing the edge at any larger angle would miss the detector. FIG. 3 depicts another ray X, which also arrives from the upper left at angle α but hits the right edge of the aperture 31. As a consequence, the concentrator wall reflects ray X.

As was explained above, the intersection of the collector wall with the plane of the paper in FIG. 3 is two parabola segments 32 and 33. The axis of symmetry of the parabola of which curve 32 is a segment is tilted clockwise from the concentrator's axis of symmetry by the design angle α, while that of the parabola of which curve 33 is a segment is counterclockwise by the same angle. Ray X is therefore parallel to the axis of the parabola of which segment 33 is a part, so the concentrator reflects ray X to the left edge of the upper detector surface, which is the focus of that parabola. The concentrator similarly reflects to the left edge of detector 20 all rays parallel to rays W and X that reach any point in aperture 31. It can be demonstrated by similar reasoning that all rays parallel to rays Y and Z, which correspond to rays W and X, respectively, but arrive at opposite sides and at opposite angles, will be focused to the extreme right edge of the detector 20.

Although, with the exception of limiting ray W, all radiation reaching the aperture 31 from the upper left at angle α is focused to the same point, the concentrator 28 is not an imaging concentrator, and it does not direct radiation to the detector 20 in an imaging manner: at other angles, the radiation from the upper left is not parallel to the axis of the parabola, so it is not focused to any point in the detector plane. Instead, light reaching the aperture 31 at any angle less than α is spread across the surface of the detector 20 in accordance with the positions at which it enters the aperture.

But it does all reach the detector. Specifically, any ray entering at an angle less than angle α either goes directly to the detector or is reflected to it from the concentrator wall. Since rays arriving at angle α from the upper right are directed to the left edge of the detector 20, a ray must be reflected by the curve-33 part of the concentrator 28 reflected to a point to the right of the left edge of the detector. Moreover, by the properties of parabolas, such a ray must be reflected to a point left of curve 32. In other words, it must hit the detector 20. Rays arriving from the upper right at an angle less than α and reflected by the curve-32 part of from the detector wall are similarly reflected to the detector 20.

In contrast, no ray reaches the detector 20 if its angle with the axis of symmetry is greater than the design angle α. Specifically, if a ray grazes the upper left corner of the collector at an angle greater than that of ray W, it does not reach the detector directly, so no ray parallel to it does, either. Moreover, since such a ray striking a given point on the concentrator wall does so at an angle greater than that at which the same point is struck by a ray parallel to ray W, such a ray is reflected to a point to the left of the left corner of the collector 20. That is, it does not hit the detector 20 as a result of that reflection, and it can be shown that further reflections merely direct the ray back out into space. A similar analysis indicates that rays arriving from the upper right at an angle greater than α also fail to reach the detector 20.

It can be shown that, for all rays coplanar with the concentrator's axis of symmetry, the compound-parabolic concentrator meets the criterion expressed by the two-dimensional version of the étendue-preservation equation, i.e., $$nl \sin \Theta = n'l' \sin \Theta',$$

where l is the diameter of the aperture 32. Thus, for all such radiation, étendue is preserved. One might conclude from this and the foregoing discussion that detector output is a discontinuous function of angle, i.e., that it remains at its maximum value throughout a 2α range and then drops immediately to zero outside that range. But this is not the result in practice.

Even if the upper edges of the concentrator are placed precisely, even if the concentrator surfaces are exactly parabolic in every cross-section through the axis of symmetry, and even if the surfaces are perfectly reflective, the function will not be discontinuous. This is a result of the fact that analysis undertaken with respect to FIG. 3 applies only to rays that are coplanar with the axis of symmetry. In fact, many are skew rays, i.e., rays that travel in planes that do not include the axis of symmetry and in which the intersection with the concentrator wall is not compound-parabolic. The presence of skew paths results in a departure from étendue preservation as well as from discontinuity in the output as a function of angle. It turns out, however, that this deviation is minor and, in some sense, beneficial, since it provides an angular regime in which one can avoid a bang-bang control strategy but still obtain the sensitivity required for accurate tracking.

Figure 4:
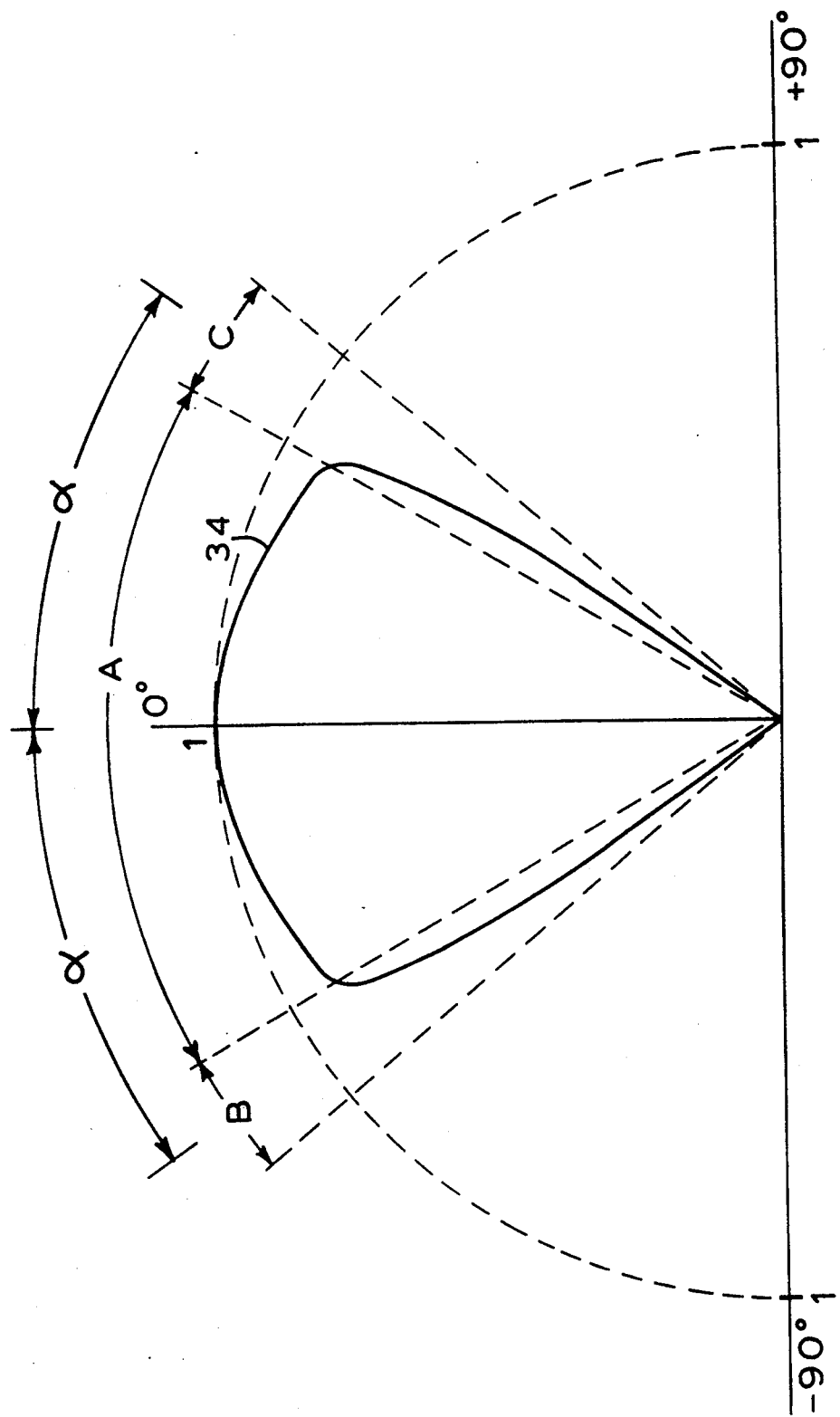
FIG. 4 is a plot of detector output power as a function of the angle that the path of the incoming radiation forms with a the concentrator axis in the tracker of FIG. 1.

FIG. 4 is a plot of the radiation power at the detector as a function of the angle at which the radiation reaches the aperture, i.e., as a function of the angle between the concentrator axis of symmetry and the line of sight to the radiation source, where the source is disposed at a fixed large distance and radiates at a given power. Throughout an input-angle range A, substantially all radiation entering aperture 31 of FIG. 3 reaches the detector 20. Accordingly, the radiation power represented by the detector output 20 varies substantially only as the cosine of the angle, just as the power received at the aperture does. That is, it varies by only a little throughout a substantial range. This feature results in a wide tracker field of view.

Just beyond the edges of range A, however, in ranges B and C, the signal level drops off dramatically with angle; that is, the output is very angle-sensitive in angle ranges B and C but not in range A. In fact, the detector output can readily be made much more sensitive to angle than the drawing suggests. The drawing depicts ranges B and C for purposes of explanation as being much less narrow than is readily achievable in practice; concentrators can readily be so fabricated that their detector outputs drop by 90% within 2 or 3 degrees. I use this feature to achieve high tracking accuracy.

By orienting the two concentrators 27 and 28 at angles to each other, one can use the outputs of their associated detectors for tracking. There are many ways to use the output for tracking purposes, although they all ultimately rely on the same principle. One merely chooses a function of the two outputs, such as the ratio of or difference between them, and then selects an angular position to one side of which all values of the function are greater than a predetermined value while all those to the other side are less than the predetermined value, at least throughout an angular domain in which the detector outputs are significant. This function is then used to aim the tracker.

In the case of ideal étendue-preserving concentrators with discontinuous cut-offs, this approach translates most readily into what is essentially a "bang-bang" control strategy in which the tracking mechanism is driven essentially with full force in one way in response to a significant output from one of the detectors and essentially with full force in the other way in response to a significant output from the other. Between the cut-off angles of the two concentrators in such an arrangement there might be a dead zone, in which neither or both of the detectors generate outputs.

As those skilled in the art will recognize, bang-bang control strategies have their drawbacks. Departures of practical concentrators from the ideal enable one to avoid these drawbacks, as will be illustrated in connection with FIG. 5.

Figure 5:
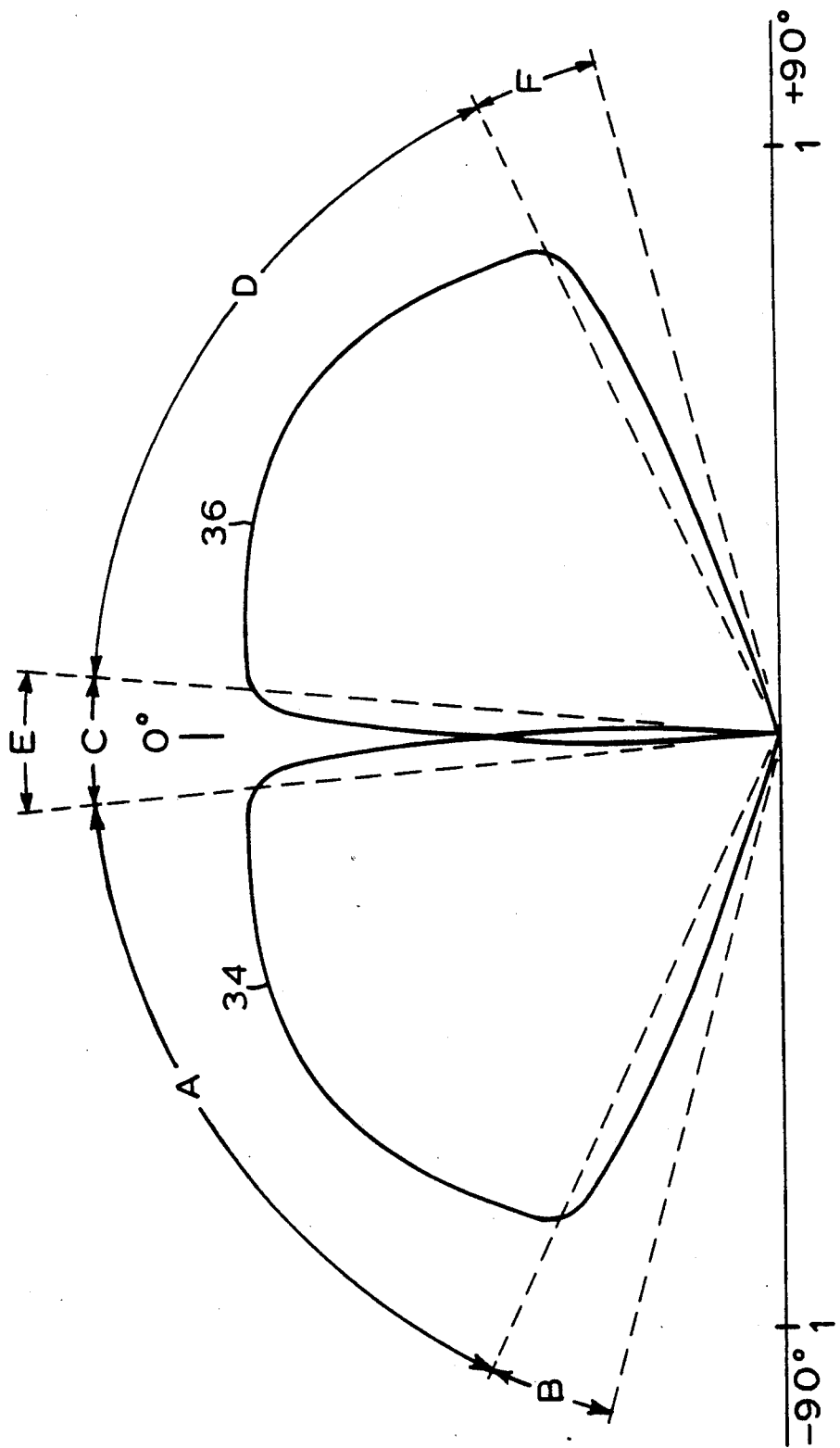
FIG. 5 comprises curves similar to that of FIG. 4 for two concentrator-detector units of the type employed in the present invention.

FIG. 5 includes the curve 34 of FIG. 4 tilted counterclockwise to represent the orientation of concentrator 28 on the receiver assembly 12. FIG. 5 also depicts another curve 36, this one representing concentrator 27. Curve 36 is similar to curve 34, but it is tilted in the opposite direction. It has angular regions D, E, and F that correspond to regions A, B, and C, respectively; that is, the output is relatively insensitive to angle in region D but very sensitive in regions E and F. As FIG. 5 shows, the two concentrators 27 and 28 are so oriented that their respective curves overlap in their respective sensitive regions C and E, which respond oppositely to angle changes; that is, when the angle of incidence changes in those regions, the output of one of the detectors increases while that of the other decreases.

This relationship enables one to perform accurate tracking and wide-range acquisition in such a manner that acquisition and tracking are essentially a single function. For instance, the drive signal to the motor can be proportional to, say, the difference between the detector outputs divided by their sum. (As those skilled in the art of control systems will recognize, such a signal would typically be modified by, for instance, rate feedback.) Throughout angular ranges A and D, the resultant value would be a maximum or nearly maximum positive or maximum negative value, and the result would be to drive the tracker with the maximum force in one way or the other. In the overlapping regions C and E, on the other hand, the drive signal would decrease in absolute value and thus provide desirable proportional control. As is apparent from an inspection of FIG. 5, the drive signal would be very sensitive to angle in that region, so the resultant tracking can be quite accurate.

Although the curves of FIG. 5 overlap in their sensitive regions, the broader aspects of the present invention can be practiced in concentrators whose curves are angularly displaced by more or less than the amount shown. For instance, if the regions A and C were to overlap but be offset enough so that their maxima do not coincide, the same control strategy could apply. Such a strategy would not result in the same tracking sensitivity, however, since such a strategy would rely on a gradual cosine variation in the power that reaches the apertures rather than on a steep variation in the fraction of the received power that reaches the detector.

Additionally, although one can use concentrators whose characteristics differ greatly from those of FIGS. 4 and 5, I prefer concentrators whose cutoffs are relatively abrupt. The half width of the concentrator's central angular range, in which the fraction of the received radiation that reaches the detector falls to half its maximum value, should be at least ten, and preferably twenty-five, times the width of its cutoff region, in which that fraction drops by 80% of its remaining value. As was mentioned above, however, the broader aspects of the invention can be practiced without meeting these criteria.

The arrangement of the present invention avoids many of the deficiencies with which optical trackers that employ lenses are afflicted, and it can be produced more economically and weigh less. Additionally, the surface quality of the cones need not be nearly as good as that required of lenses or mirrors used in conventional optical trackers; in comparison with the performance of imaging systems, that of my non-imaging systems does not suffer nearly as much from normally encountered reflector aberrations.

The size of an optical tracker of the present invention can also be less than that required of an imaging-type tracker. It is true that the area of the lens in an imaging-type system is in theory required to be only as great as that of the concentrator apertures in a non-imaging system of the present invention having the same light-collecting capability. In practice, however, lenses are not perfect, and the lens area must be greater than the theoretical value since only a fraction of the lens's total area is ordinarily of a quality high enough to be used for tracker applications.

Figure 6:
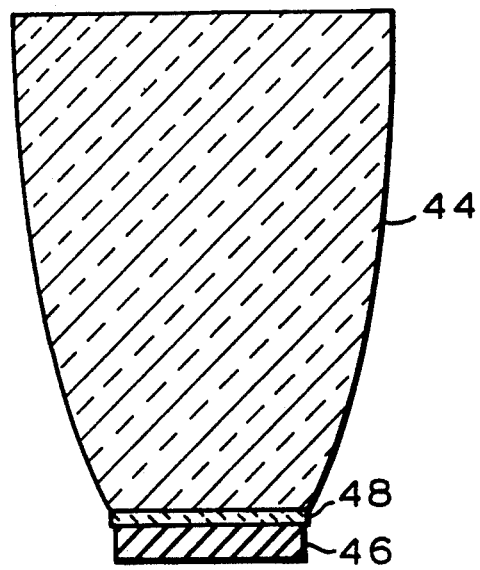
FIG. 6 is a cross-sectional view of a concentrator-detector section of the type employed in an alternate embodiment of the present invention.

Concentrator 28 of FIG. 3 is a hollow cone comprising plastic wall material 40 whose surface 42 is an electrodeposited or electroformed metal. Metals such as nickel and gold are suitable. The cones can also be made of a solid transparent to the radiation of interest. FIG. 6 depicts such an arrangement, in which a solid compound-parabolic concentrator 44 is secured at its smaller end to a detector 46 by cement 48. By employing total internal reflection, such arrangements avoid the need for a metal coating.

Solid cones can be made of any one of a wide variety of materials; crystalline materials such as silicon or germanium can be employed, as can amorphous materials such as plastic or glass. Detectors can be cemented (optically contacted) to the rear mouths of solid cones in such a manner that no air gap exists between the cones and their respective detectors. The cement 48 should have an index of refraction equal to or greater than that of the cone material, since internal reflection will otherwise prevent some of the rays from reaching the detector 46. Similarly, the detector should have an index of refraction at least as great as that of the cone.

While the use of an étendue-preserving system can yield the largest possible collection area for given detector size and combination of propagation media, the use of solid concentrators can result in an advantage in the ratio of collection area to detection area, because the increase in the maximum area ratio increases as the square of the ratio of the index of refraction of the cone material to the (nearly unity) refractive index of the air from which the radiation is received. The indices of most plastics is around 1.5, those of glasses fall in the range of 1.5–2.0, that of silicon is approximately 3.4, and that of germanium is approximately 4.0. The resulting performance is equivalent to that of an immersion lens in a traditional lens-type concentrator system, but it can be done much less expensively.

Figure 7:
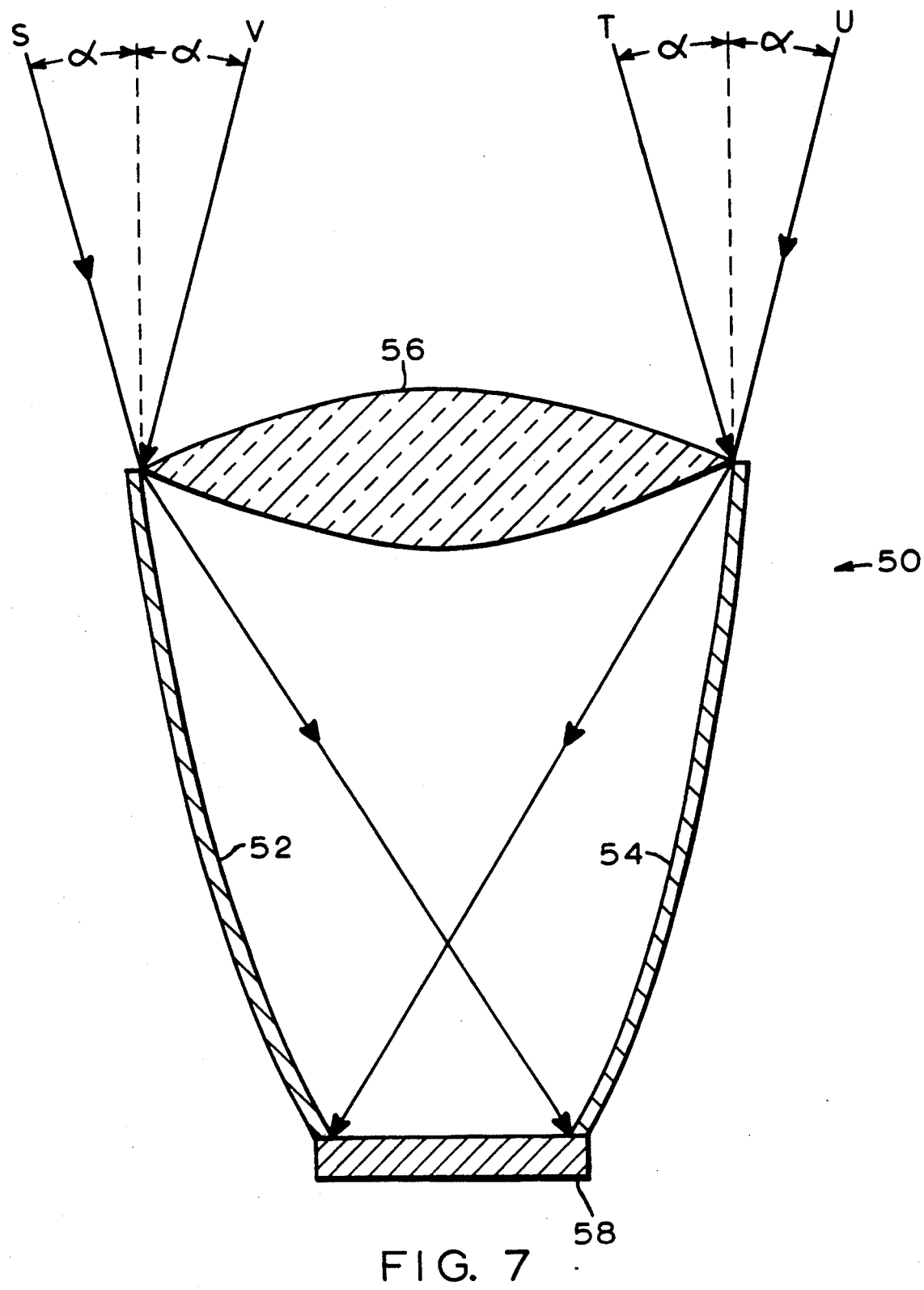
FIG. 7 is a cross-sectional view of a concentrator-detector unit of the type employed in yet another embodiment of the present invention.

Although the present invention makes it possible to avoid the use of expensive, heavy lenses, its principles can also be employed in lens-type systems. In the embodiment of FIG. 7, a hollow concentrator 50 intersects the plane of its axis of symmetry in segments 52 and 54 of separate hyperbolas. Because of the compound-hyperbolic shape of its wall, the concentrator includes a lens 56 at its entrance aperture. Despite the presence of the lens, however, the concentrator does not direct the light to the detector 58 in an imaging manner, as will be explained by considering four light rays, S, T, U, and V.

Before discussing the paths of those rays, however, it will be beneficial to describe the spatial relationship among the lens 56, the detector 58, and the hyperbolas. Each of the curves 52 and 54 meets the upper surface of the detector 58 at the inner focus of the hyperbolas of which the other curve is a segment. Each curve meets the lens 56 on the line defined by its own inner focus and the other curve's outer focus. The lens 56 has a focal plane, not shown, oriented horizontally and disposed below the plane of the detector 58; that is, in the absence of the concentrator 50 and detector 58, all light incident upon the lens 56 at a given angle would arrive at the same point in the focal point. Each of the hyperbolas of which 52 and 54 are parts has one of its foci in the focal plane. Specifically, the hyperbola of which segment 52 is a part has a focus at the point to which lens 56 would focus all light that hits it from the upper left at the design angle $\alpha$. Similarly, one of the foci of the hyperbola of which segment 54 is a part is the point of focus for rays arriving at the lens from the upper right at angle $\alpha$.

With this background, it can be appreciated that lens 56 aims ray S, which strikes lens 56 at its left edge at the design angle $\alpha$, toward the outer focus of the hyperbola of which segment 54 is a part. As a consequence, the concentrator wall reflects ray S to the inner focus of that hyperbola, i.e., to the left edge of the detector 58, although, for the sake of clarity, FIG. 7 omits an indication of such a reflection. Similarly, the concentrator 50 reflects ray T to the detector's left edge, so it is apparent that all rays arriving from the upper left at angle $\alpha$ are focused on the left edge.

Similarly, rays U and V, which arrive from the upper right at the design angle $\alpha$, and all rays between and parallel to them, are directed to the right edge of the detector 58. Although, for these two angles, all radiation is directed to respective single points in the detector plane, these are the only two angles for which such focusing occurs, so the collector does not direct radiation to the detector 58 in an imaging manner.

Through reasoning similar to that followed in connection with the analysis of the compound-parabola-type concentrators, it can be shown that all radiation received at the lens 56 at angles between the two design angles reaches the detector 58, while all radiation received at angles outside the design angles is prevented from reaching the detector 58. The remainder of the operation of a tracker employing such a unit can therefore be identical to that of the compound-parabolic embodiment.

The cones of FIGS. 3, 6, and 7 are known as "angle-converting cones"; radiation reaching the aperture at angles between 0° and the design angle $\alpha$ are directed to the detector at ranges between 0° and 90° in the illustrated embodiments. Of course, not all angle-converting cones result in the same ranges. In the illustrated embodiments, the limiting output angle, 90°, results when incoming radiation whose angle is the design angle $\alpha$ hits the concentrator wall at the point where that wall meets the detector. In many cases, it is not desirable to have the concentrator walls touch the detector. To deal with this problem, one might provide walls whose output range does not reach 90°. For instance, if one cut off a bottom section of one of the cones of FIGS. 3, 6, and 7 and replaced it with a straight-sided cone whose slope is the same as that of the parabola or hyperbola at the point where the cone was cut, the resulting output angular range would stop short of 90° and thus eliminate the need for the concentrator wall to meet the detector.

As was indicated above, the invention has been described in connection with a tracker for tracking in two dimensions, in which four concentrator/detector units are necessary. For tracking in a single dimension, only two detectors and corresponding concentrators are necessary. The invention can additionally be practiced in linear arrays or two-dimensional arrays of concentrator-detector elements. Moreover, a system of the present invention can employ concentrators whose reflectors are other types of angle-converting surfaces. Thus, the embodiments described above are to be regarded as illustrative only, and many variations and modifications to these embodiments can be made without departing from the principles of the invention that appended claims define.

I claim:

1. For tracking the position of an object from which it receives radiation, an optical tracker comprising:
   (A) a receiver assembly that includes:
      (i) a plurality of radiation detectors, adapted for reception of radiation thereon, for generating detector outputs representative of the radiation power that they receive;
      (ii) a non-imaging, substantially étendue-preserving radiation concentrator associated with each detector, each concentrator having an inlet aperture and being disposed to receive radiation at the inlet aperture and, in a non-imaging manner, to direct to the transducer associated therewith a fraction of the received radiation that is a function of the angle at which the radiation reaches the aperture, the concentrators being so disposed in the receiver that the angular range for each concentrator function is displaced from the angular range of each other concentrator function;
   (B) an aiming mechanism, adapted for application of control signals thereto, for aiming the receiver assembly in response to control signals applied thereto; and
   (C) control circuitry, responsive to the detector outputs, for generating and applying to the aiming mechanism control signals that cause the aiming mechanism to aim the receiver assembly in a direction in which the relationship between the detector outputs assumes a predetermined value.

2. A tracker as defined in claim 1 wherein each concentrator comprises a cone of substantially compound-parabolic cross-sectional shape.

3. A tracker as defined in claim 2 wherein each cone is a hollow cone whose inner surface provides the substantially compound-parabolic cross-sectional shape.

4. A tracker as defined in claim 2 wherein each cone is a solid cone whose outer surface provides the substantially compound-parabolic cross-sectional shape.

5. A tracker as defined in claim 4 wherein:
(A) the tracker includes cement that secures the cone to the detector and has an index of refraction at least equal to that of the cone; and
(B) the index of refraction of the detector is at least equal to that of the cone.

6. For tracking the position of an object from which it receives radiation, an optical tracker comprising:
(A) a receiver assembly that includes:
  (i) a plurality of radiation detectors, adapted for reception of radiation thereon, for generating detector outputs representative of the radiation power that they receive;
  (ii) a non-imaging radiation concentrator associated with each detector, each concentrator having an inlet aperture and being disposed to receive radiation at the inlet aperture and, in a non-imaging manner, to direct to the transducer associated therewith a fraction of the received radiation that is a function of the angle at which the radiation reaches the aperture such that the concentrator function has its maximum within a central angular range bounded by boundary angles at which the concentrator function is half the maximum, and the function further falls from its value at the boundary angle by eighty percent within a contiguous narrow angular range whose width is less than one-tenth that of the central range, the concentrators being so disposed in the receiver that the angular range for each concentrator function is displaced from the angular range of each other concentrator function;
(B) an aiming mechanism, adapted for application of control signals thereto, for aiming the receiver assembly in response to control signals applied thereto; and
(C) control circuitry, responsive to the detector outputs, for generating and applying to the aiming mechanism control signals that cause the aiming mechanism to aim the receiver assembly in a direction in which the relationship between the detector outputs assumes a predetermined value.

7. A tracker as defined in claim 6 wherein each concentrator comprises a cone of substantially compound-parabolic cross-sectional shape.

8. A tracker as defined in claim 7 wherein each cone is a hollow cone whose inner surface provides the substantially compound-parabolic cross-sectional shape.

9. A tracker as defined in claim 7 wherein each cone is a solid cone whose outer surface provides the substantially compound-parabolic cross-sectional shape.

10. A tracker as defined in claim 9 wherein:
(A) the tracker includes cement that secures the cone to the detector and has an index of refraction at least equal to that of the cone; and
(B) the index of refraction of the detector is at least equal to that of the cone.

11. An optical tracker as defined in claim 7 wherein the width of the cut-off range is less than one-twenty-fifth that of the central range.

12. An optical tracker as defined in claim 6 wherein the width of the cut-off range is less than one-twenty-fifth that of the central range.

* * * * *

UNITED STATES PATENT AND TRADEMARK OFFICE
CERTIFICATE OF CORRECTION

PATENT NO. : 5,023,440

DATED : June 11, 1991

INVENTOR(S) : John D. Kuppenheimer JR.

It is certified that error appears in the above-identified patent and that said Letters Patent is hereby corrected as shown below:

In column 1, lines 5-9, should read -- This application is a continuation-in-part of a prior U.S. patent application Ser. No. 07/385,975 filed on July 26, 1989 by John D. Kuppenheimer, Jr. for a Tracker Using Angle-Converting Cones now abandon, which itself was a continuation of a prior United States patent application Ser. No. 06/725,620 filed April 22, 1985. --

Signed and Sealed this

Fifteenth Day of June, 1993

*Attest:*

MICHAEL K. KIRK

*Attesting Officer*   Acting Commissioner of Patents and Trademarks